(12) United States Patent
Wang

(10) Patent No.: US 6,907,530 B2
(45) Date of Patent: Jun. 14, 2005

(54) SECURE INTERNET APPLICATIONS WITH MOBILE CODE

(75) Inventor: Jieh-Shan Wang, N. Potomac, MD (US)

(73) Assignee: V-One Corporation, Germantown, MD (US)

(*) Notice: Subject to any disclaimer, the term of this patent is extended or adjusted under 35 U.S.C. 154(b) by 778 days.

(21) Appl. No.: 09/764,459

(22) Filed: Jan. 19, 2001

(65) Prior Publication Data

US 2002/0099940 A1 Jul. 25, 2002

(51) Int. Cl.$^7$ .............................................. G06F 12/14
(52) U.S. Cl. ...................... 713/200; 713/201; 713/232; 713/229; 713/225; 380/3; 380/4; 709/224
(58) Field of Search ................................ 713/200–201, 713/232, 229, 225; 380/3–4, 23–25, 49; 709/224

(56) References Cited

U.S. PATENT DOCUMENTS

| | | | |
|---|---|---|---|
| 5,602,918 A | | 2/1997 | Chen et al. |
| 5,870,544 A | | 2/1999 | Curtis |
| 5,907,617 A | * | 5/1999 | Ronning ...................... 705/52 |
| 5,949,882 A | * | 9/1999 | Angelo ....................... 713/185 |
| 6,023,764 A | | 2/2000 | Curtis |
| 6,219,790 B1 | * | 4/2001 | Lloyd et al. ................. 713/201 |
| 6,233,577 B1 | * | 5/2001 | Ramasubramani et al. .... 707/9 |
| 6,253,248 B1 | * | 6/2001 | Nakai et al. ................. 709/237 |
| 6,715,145 B1 | * | 3/2004 | Bowman-Amuah ......... 718/101 |

OTHER PUBLICATIONS

Tezuka et al., "Seamless Object Authentication in Different Security Policy Domains", IEEE, 2000, pp. 1–6.*
Kuo, "Elements of Mobile Computing Environmnet for Future PCs Networks", IEEE, 1996, pp. 1254–1258.*

* cited by examiner

Primary Examiner—Gregory Morse
Assistant Examiner—Tongoc Tran
(74) Attorney, Agent, or Firm—Bacon & Thomas, PLLC

(57) ABSTRACT

A system and method for securing pathways to a remote application server involves a gateway or authentication server, and a mobile code authentication and encryption client available for download from the gateway or authentication server. Upon connection of a user's computing device to the authentication server over the open network, the authentication server requests authentication information, such as a password, from the user, and upon authentication of the user by the authentication server, the authentication server downloads the mobile code authentication and encryption client to the user's computing device. The authentication and encryption client then authenticates itself to authentication server, after which a secure communications channel between the user's computing device and the authentication server is opened, the secure communications channel permitting transfer of data between the user's computing device and an application server. The system and method do not require pre-installation or any certificates or other authentication and encryption software on the user's computing device, enabling the system and method to be used with thin-client and mobile computing devices, as well as with conventional computers.

6 Claims, 3 Drawing Sheets

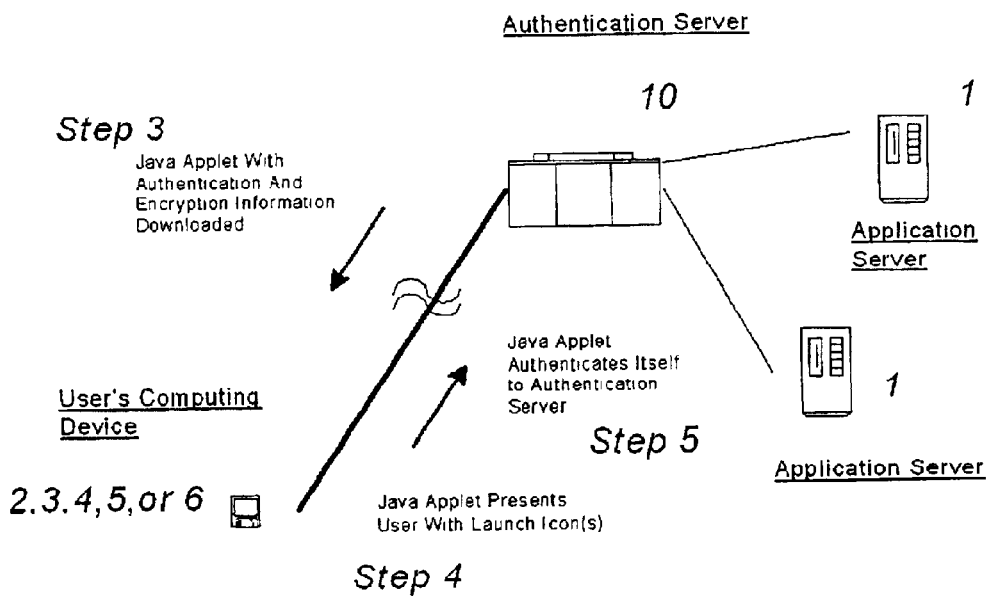
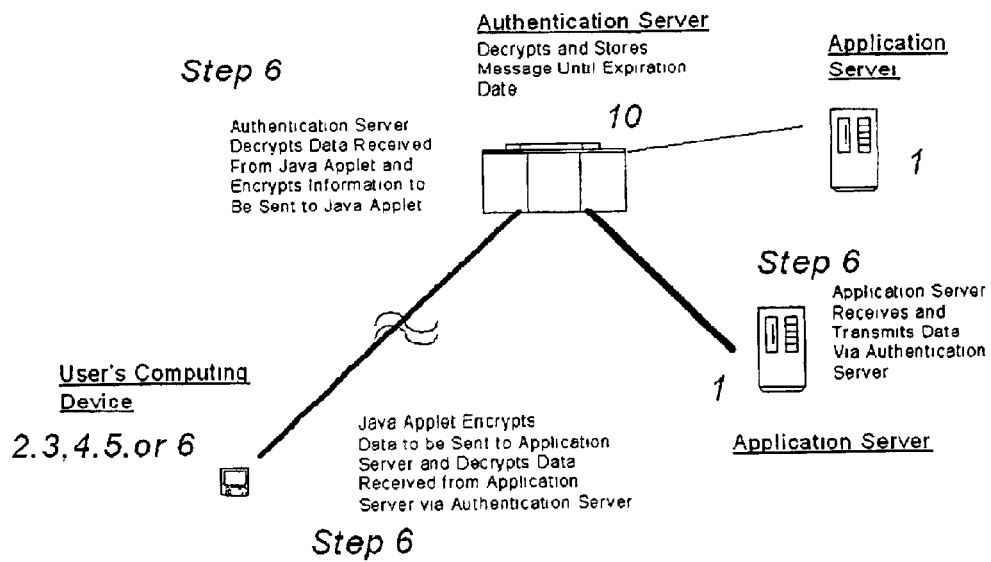

SECURE INTERNET APPLICATIONS WITH MOBILE CODE

BACKGROUND OF THE INVENTION

1. Field of the Invention

This invention relates to a system and method for establishing secured communications pathways over an unsecured open network, and in particular to a system and method for using mobile code to secure data transfers between an application running on a remote server and a client connected to the remote server via the Internet.

2. Description of Related Art

Methods and systems for establishing secured communications pathways over an unsecured open network such as the Internet are well-known.

An especially effective method for securing communications over an unsecured open network is to use a gateway or authentication server, such as V-One Corporation's SmartGate® server, to authenticate users seeking to communicate with the application server over the open network and to protect communications between the users and application servers connected to the gateway or authentication server. The gateway or authentication server cooperates with a key-holding hardware or software token pre-installed on or connected to the user's computer to authenticate the hardware or software by verifying that the secret key held by the hardware or software corresponds to a key assigned to the user, and to generate session keys which may be used to protect further communications between the user's computer and the authentication server. During the further communications, the gateway or authentication server decrypts communications from the user and forwards the decrypted communications directly to the application server, if the communications line to the application server is secure, or re-encrypts the decrypted communications before forwarding them to the application server over a more open network. Aspects of the SmartGate® server are described, by way of example, in U.S. Pat. No. 5,602,918 and in U.S. patent application Ser. No. 08/917,341, filed Aug. 26, 1997, and now allowed.

Recently, there has been an increase in demand for "thin-client" or "server-based" computing. In server-based computing, applications are run on a remote server, and a minimal amount of display information and data input is transferred between the user's computer and an application server on which the application is run, either over the Internet or over various wireless networks. In general, by running the application remotely and using the user's computing device only for display and data input purposes, an application can be run on any type of computing device capable of network communications irrespective of internal memory or processor configuration including, as shown in FIG. 1, cross-platform (non-Windows™) desktops 2, remote computing devices 3, branch office systems 4, thin client terminals 5, and wireless terminals 6, whether connected to a local area network (LAN) 7, the Internet 8, or a corporate wide area network (WAN) 9.

For a large organization, the use of server based computing eliminates the need to load and configure a desired software program on every computer in the organization, greatly reducing both installation and update costs, and allowing uniform distribution of software and updates to all computing devices in the organization, including international offices and even to individual representatives with mobile computing devices, or computing devices that do not belong to the organization.

While server-based computing offers the possibility of enabling any computing device capable of network communications to run sophisticated application programs or request other services from virtually anywhere in the world, a problem exists in that the minimal nature of the communications necessary to enable services to be provided irrespective of platform also makes it difficult to provide adequate security using conventional communications systems and methods.

Even systems secured by an authentication server such as the SmartGate® server, which can provide any desired level of encryption, are currently not capable of meeting the needs of multiple platform, thin client, and mobile computing device users, because of the requirement that software with the keys and algorithms necessary to provide authentication and establish communications with the authentication server be pre-installed on the user's computing device. As a result, in the environment shown in FIG. 1, only computer 5 with pre-installed gateway client software, and LAN 6 with pre-installed software from both the gateway server and another application server 1, are able to access the services offered by either of the servers 1.

The situation depicted in FIG. 1 is unacceptable. In a server-based computing environment, the user should be able to access application servers 1 from any computing device without having to pre-install certificates or other software, and furthermore should be able to access different application servers having different security protocols and requirements without having to install a different set of certificates or protocols for each application server to be accessed.

The present application solves the problem of eliminating the need for pre-installed software in order to establish secured communications channels to a gateway or authentication server by using a mobile authentication and encryption client to establish the secured communications channel. The resulting system and method is similar to the one described in U.S. Pat. Nos. 5,870,544 and 6,023,764. The system and method described in U.S. Pat. Nos. 5,870,544 and 6,023,764 utilize mobile code in the form of Java applets to establish communications between a user's computer and an application or "web" server, by using a web browser's installed certificates to set up and establish communications with the server, but the system and method described in these patents is not designed to be used for facilitating server-based or thin client computing. Instead, the system described in U.S. Pat. Nos. 5,870,544 and 6,023,764 uses a web browser's pre-installed certificates to set up and establish communications with the server. Before any communications can occur, the user's web browser must verify a certificate sent by the server, after which a secure socket layer (SSL) connection is established and a Java applet sent to the web browser. The Java applet then retrieves keys from the web server for use in opening a secure socket or stream to the web server.

The system and method described in U.S. Pat. Nos. 5,870,544 and 6,023,764 possesses two features which prevent application to server-based computing. First, since the two patents are concerned with authentication not only of the user but also of the server, authentication necessitates the inclusion of the above-mentioned preinstalled certificates and corresponding software unique to each service to be accessed. This eliminates the principal advantage of server-based computing, which is to permit a registered user to access a service from any computing device using a standard communications protocol, regardless of the computing devices configuration.

Second, the system and method described in U.S. Pat. Nos. 5,870,544 and 6,023,764 fails to provide for authentication of the mobile code itself before sending a "key certificate" to the applet containing the code, leaving the application server vulnerable to anyone capable of re-creating or copying the mobile code and requesting the key certificate for use in protecting further communications.

In general, therefore, the prior systems and methods for securing communications over an open network, including prior systems and methods using mobile code as described in U.S. Pat. Nos. 5,870,544 and 6,023,764, have failed to take into account the needs of server-based computing users to access servers in a secure manner from any computing device without having to pre-install client software or certificates.

A need therefore exists to extend the secured communications concepts disclosed in U.S. Pat. No. 5,602,918 and U.S. patent application Ser. No. 08/917,341, and to modify the concepts disclosed in the IBM patents, so as to eliminate the need for pre-installation of client software for each applications server by using mobile code to establish pathways to the application server from any platform, including mobile and thin client platforms, regardless of the specific authentication method, while at the same time providing authentication of the mobile code at the time the pathways are established.

SUMMARY OF THE INVENTION

It is accordingly a first objective of the invention to provide a method and system for establishing a secured communications pathway between a remote applications server and a computing platform, regardless of computing platform configuration or authentication method.

It is a second objective of the invention to provide a method and system for securing remote server-based applications.

It is a third objective of the invention to provide a method and system which provides a centralized security solution for all Internet applications.

It is a fourth objective of the invention to provide a method and system which enables secured pathways to be established to a remote server without pre-installation of client software specific to the gateway or application server, or to the application server sought to be accessed in a secure manner.

These objectives are achieved, in accordance with the principles of a preferred embodiment of the invention, by providing a system for securing pathways to a remote application server that includes a gateway or authentication server, and a mobile encryption and authentication client available for download from the gateway or authentication server to the user's computing device and executable within the user's browser or communications software so as to be independent of the underlying configuration of the user's computing device, the gateway or authentication server being arranged to authenticate the user based on a user identifier or password, and to authenticate the encryption and authentication client upon execution, the client being arranged to encrypt communications between the user and the gateway server.

The objectives of the invention are also achieved, in accordance with the principles of the preferred embodiment of the invention, by providing a method of securing pathways to a remote application server including the steps of establishing communications with a gateway or authentication server, authenticating the user to the server, selecting an application, downloading a mobile encryption and authentication client, establishing a secured communications pathway or channel between the downloaded encryption and authentication client and the gateway or authentication server, and launching the application with data transfer through the secured communications path to the gateway or authentication server.

In an especially advantageous embodiment of the invention, the mobile authentication and encryption client is in the form of a Java applet, and authentication of the client involves the use of secret keys to generate a session key in the manner described in U.S. Pat. No. 5,602,918 and available from V-One Corporation's SmartGate® server, although the invention is not limited to a particular authentication procedure, to a particular type of gateway or authentication server, or to a particular type of mobile code. In addition, it will be appreciated that the "gateway or authentication server" may be a discrete entity, or may be implemented as a hardware or software part of the application server itself. Finally, those skilled in the art will appreciate that while the present invention is especially useful in the contexts of mobile or thin client computing, the invention can be implemented on any open network, used by computing devices which are neither thin nor mobile, and applied to any type of service offered by a server rather than just the services normally associated with server-based computing.

BRIEF DESCRIPTION OF THE DRAWINGS

FIGS. 2–4 are schematic diagrams of a system for establishing secured communications pathways over an unsecured open network, according to the principles of a preferred embodiment of the invention.

DETAILED DESCRIPTION OF THE PREFERRED EMBODIMENTS

Figure 1:
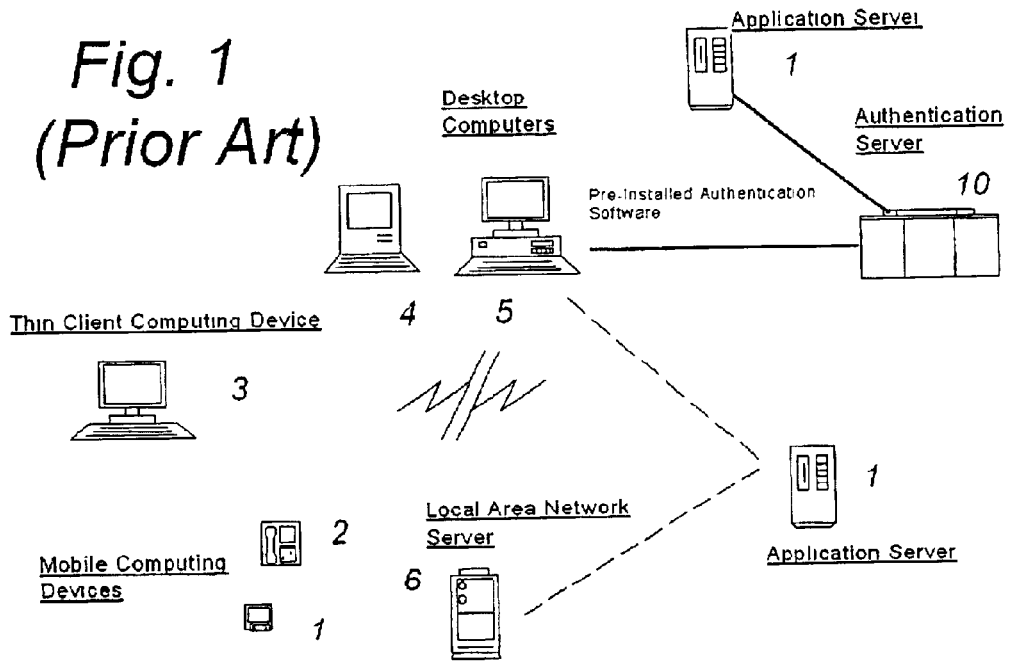
FIG. 1 is a schematic diagram of a server-based computing environment, with conventional authentication.
Figure 2:
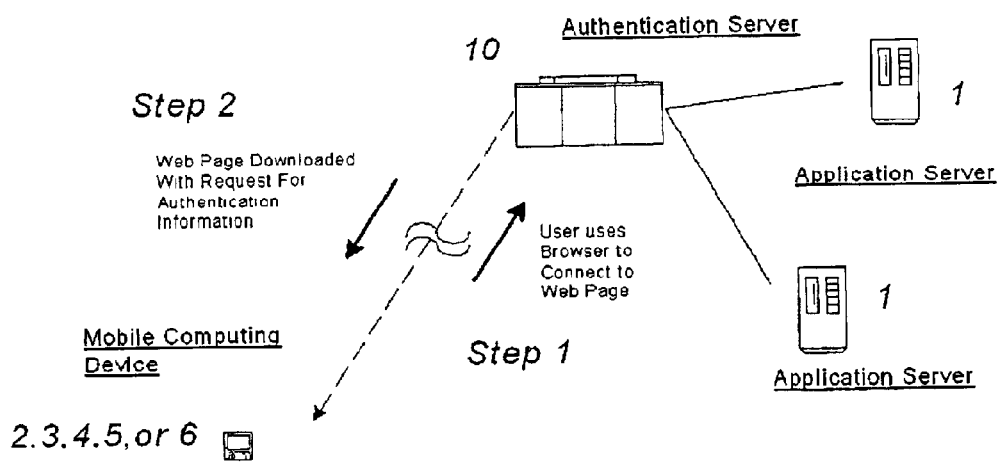

As illustrated in FIGS. 2–4 (which show both the system and method of the preferred embodiment of the invention), the system of the preferred embodiment includes a gateway or authentication server 10 corresponding to gateway or authentication server 10 illustrated in FIG. 1, but configured to supply a mobile authentication and encryption client, as described below.

Gateway server 10 serves as a gateway to permit the establishment of communications between a user's computing device, which may include any of the various computing devices 2–6 illustrated in FIG. 1, or any other computing device capable of connecting to the Internet and of serving as a user interface for applications or services run on one or more of the remote application servers 1.

The gateway or authentication server may be a server corresponding to the V-One Corporation's SmartGate™ server, or any other server capable of carrying out authentication and encryption services in cooperation with the preferred mobile authentication and encryption client.

Figure 5:
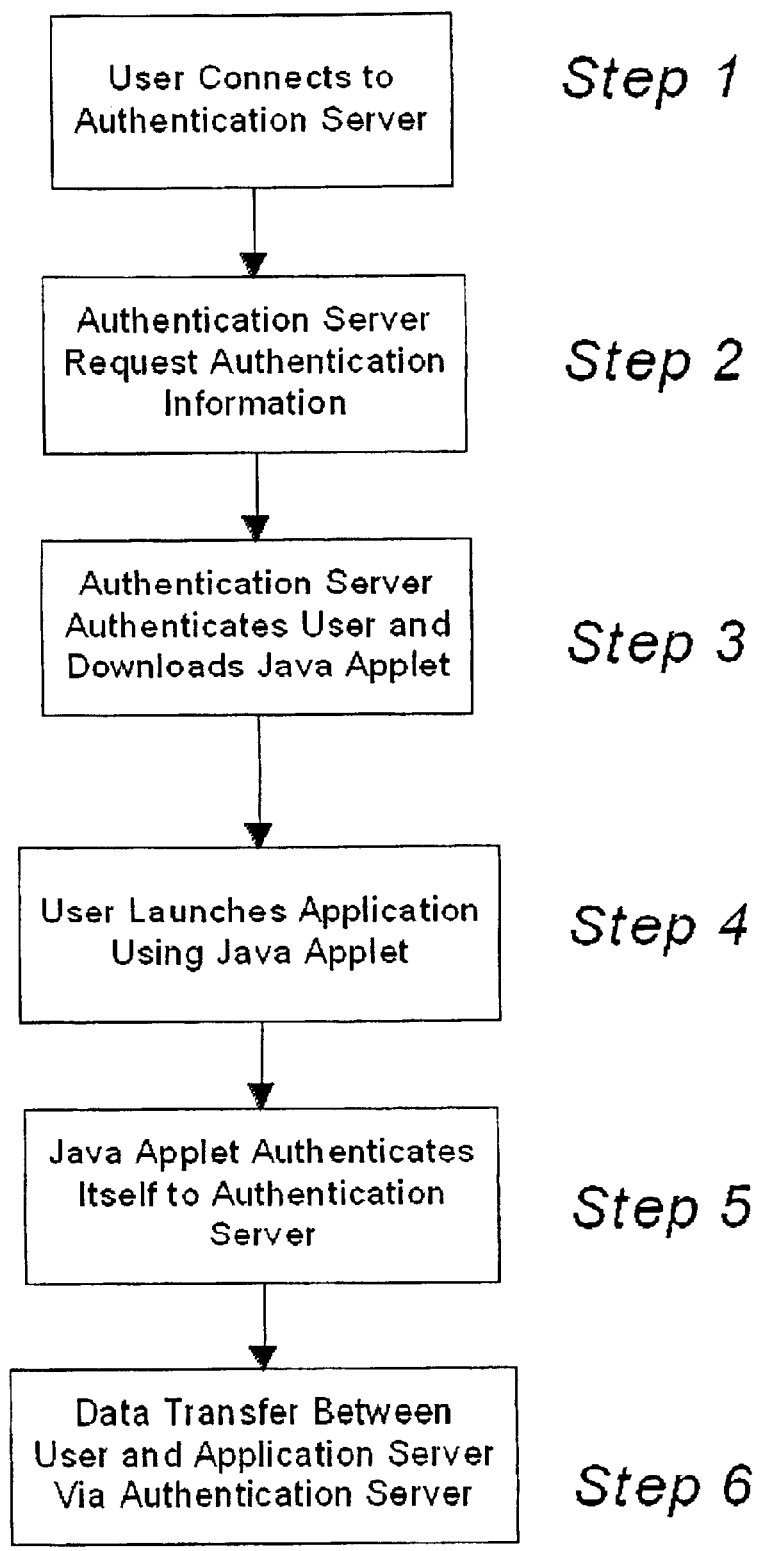
FIG. 5 is a flowchart illustrating a method of establishing secured communications pathways over an unsecured open network, according to the principles of the preferred embodiment of the invention.

As illustrated in FIGS. 2 and 5, the initial connection to the authentication server, occurs through a conventional TCP/IP connection established when the user causes his or her browser to select the address or uniform resource locator (URL) of the authentication server (step 1), and the authentication server downloads a web page to the user requesting the entry of user authentication information (step 2).

The user authentication information may be in the form of a password, securID™, data from a biometrics scanner, or any other identifying information that has previously been supplied to the gateway or authentication server through a conventional registration procedure. The authentication information may be encrypted through a secure socket or similar encryption protocol implemented by the user's browser, or by proxy through an applications level encryption and authentication program, as described in the above-cited allowed U.S. patent application Ser. No. 08/917,341, using known encryption techniques to provide security for the initial authentication procedure.

As illustrated in FIGS. 3 and 5, after the gateway or authentication server 10 has authenticated the user, server 10 downloads to the user's computing device mobile code including an authentication and encryption client executable within the user's browser so as to avoid dependence on a particular platform (step 3).

The downloaded mobile code preferably contains information necessary to establish a secure communications channel to one or more application servers 1, and may be in the form of a Java applet that can be executed via the user's browser software, or any other platform-independent applet or program capable of running within the user's browser, or of self-installing on the user's computing device.

In addition, the downloaded mobile code preferably will include additional authentication and/or encryption information, such as encryption keys and algorithms. Once the user requests a desired application program to be run on the remote server by using a client included with the mobile code (step 4), the authentication and encryption client authenticates itself to the gateway or authentication server using the additional authentication information (step 5) in order to establish a secured communications channel to the appropriate application server 1 via the gateway or authentication server 10. While the invention is not limited to a particular authentication and encryption method, the encryption and authentication method described in U.S. Pat. No. 5,602,918, incorporated by reference herein, is especially secure.

Upon establishing the secure communications channel from the user's computing device to the gateway or authentication server, further exchanges of data may be carried out (step 6). The further exchanges of data may include, for example, exchange of additional identification or authentication information required by the application server or service to be accessed. Alternatively, the user may proceed to run the program or use the service in known fashion without further authentication via the secured communications channel. Except for the initial request for a identifier or password, the request for access to the service, and subsequent requests from the service itself, the procedure for establishing the secure communications channel can be entirely transparent to the user.

Having thus described a preferred embodiment of the invention in sufficient detail to enable those skilled in the art to make and use the invention, it will nevertheless be appreciated that numerous variations and modifications of the illustrated embodiment may be made without departing from the spirit of the invention, and it is intended that the invention not be limited by the above description or accompanying drawings, but that it be defined solely in accordance with the appended claims.

I claim:

1. A system for establishing secured communications pathways across an open unsecured network using mobile code, comprising:

an authentication server;

at least one application server arranged to be connected to the authentication server by a secured pathway; and at least one platform-independent mobile code authentication and encryption program, wherein said authentication server is arranged to supply said platform-independent mobile code authentication and encryption program to a user's computing device upon authentication of the user, wherein said platform-independent mobile code authentication and encryption program is arranged to authenticate itself to the authentication server to establish a secure communications pathway without requiring pre-installation of authentication and encryption client software on the user's computing device, and wherein said platform-independent mobile code authentication and encryption program is arranged to the transmit data from the user's computing device to an application server by encrypting the data and transmitting the data to the authentication server for forwarding to the application server, and by decrypting data originating from the application server and transmitted via the authentication server.

2. A system as claimed in claim 1, wherein said platform-independent mobile code authentication and encryption program is a java applet.

3. A system as claimed in claim 1, wherein said user's computing device is selected from the group consisting of a thin-client computing device and a mobile computing device having an installed communications program, but no pre-installed authentication certificates or authentication and encryption software.

4. A method of establishing secured communications pathways across an open unsecured network using mobile code, comprising the steps of:

upon connection of a user's computing device to an authentication server over an open network, requesting authentication information from the user;

upon authentication of the user by the authentication server, downloading mobile code including an authentication and encryption client from the authentication server to the user's computing device;

causing the authentication and encryption client to authenticate itself to the authentication server;

upon authentication of the authentication and encryption client, opening a secure communications channel between the user's computing device and the authentication server, said secure communications channel permitting transfer of data between the user's computing device and an application server.

5. A method as claimed in claim 4, wherein the authentication information requested from the user is a password.

6. A method as claimed in claim 4, wherein the steps of authenticating the authentication and encryption client, and of opening a secure communications channel include the step of developing a session key for use in encrypting communications between the user's computing device and the authentication server.

* * * * *

(12) INTER PARTES REEXAMINATION CERTIFICATE (577th)
United States Patent
Wang

(10) Number: US 6,907,530 C1
(45) Certificate Issued: Apr. 11, 2013

(54) SECURE INTERNET APPLICATIONS WITH MOBILE CODE

(75) Inventor: Jieh-Shan Wang, N. Potomac, MD (US)

(73) Assignee: SSL Services LLC, Sterling, VA (US)

Reexamination Request:
No. 95/001,447, Oct. 4, 2010

Reexamination Certificate for:
Patent No.: 6,907,530
Issued: Jun. 14, 2005
Appl. No.: 09/764,459
Filed: Jan. 19, 2001

(51) Int. Cl.
*H04L 29/06* (2006.01)

(52) U.S. Cl.
USPC .............................. 726/12; 709/224

(58) Field of Classification Search .......... None
See application file for complete search history.

(56) References Cited

To view the complete listing of prior art documents cited during the proceeding for Reexamination Control Number 95/001,447, please refer to the USPTO's public Patent Application Information Retrieval (PAIR) system under the Display References tab.

*Primary Examiner* — Matthew Heneghan

(57) ABSTRACT

A system and method for securing pathways to a remote application server involves a gateway or authentication server, and a mobile code authentication and encryption client available for download from the gateway or authentication server. Upon connection of a user's computing device to the authentication server over the open network, the authentication server requests authentication information, such as a password, from the user, and upon authentication of the user by the authentication server, the authentication server downloads the mobile code authentication and encryption client to the user's computing device. The authentication and encryption client then authenticates itself to authentication server, after which a secure communications channel between the user's computing device and the authentication server is opened, the secure communications channel permitting transfer of data between the user's computing device and an application server. The system and method do not require pre-installation or any certificates or other authentication and encryption software on the user's computing device, enabling the system and method to be used with thin-client and mobile computing devices, as well as with conventional computers.

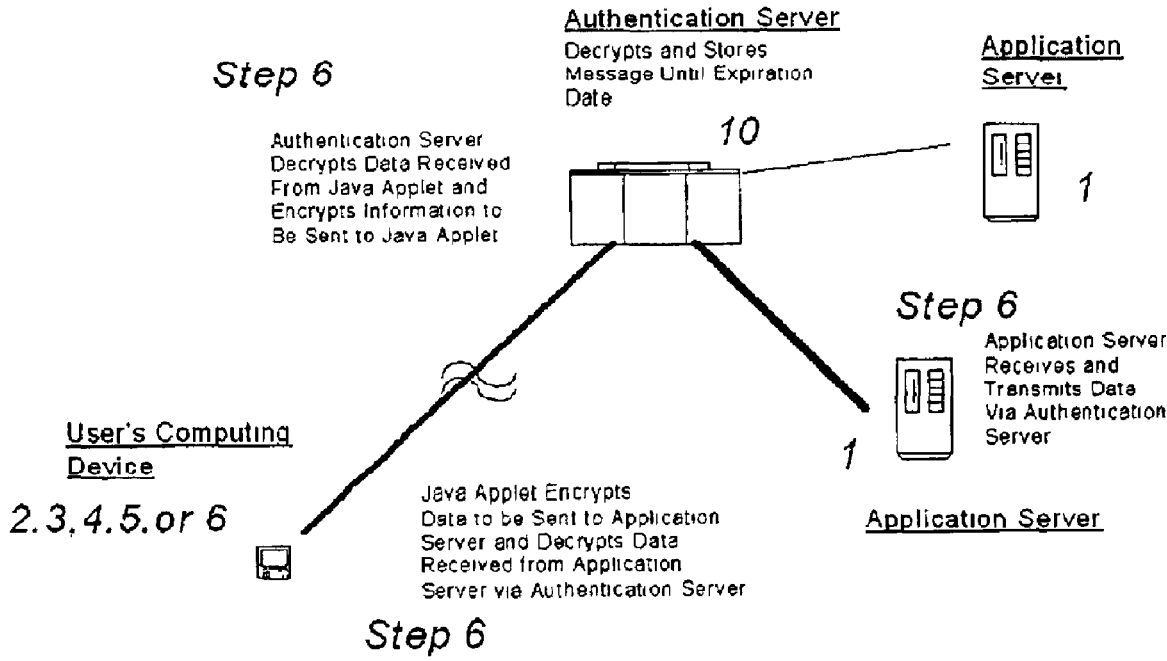

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-6 are cancelled.

New claims 7 and 8 are added and determined to be patentable.

*7. A system for establishing secured communications pathways across an open unsecured network using mobile code, comprising:*
  *an authentication server;*
  *at least one application server arranged to be connected to the authentication server by a secured pathway; and*
  *at least one platform-independent mobile code authentication and encryption program,*
  *wherein said authentication server is arranged to supply said platform-independent mobile code authentication and encryption program to a user's computing device upon authentication of the user,*
  *wherein said platform-independent mobile code authentication and encryption program is arranged to authenticate itself to the authentication server to establish a secure communications pathway without requiring pre-installation of authentication and encryption client software on the user's computing device,*
  *wherein said platform-independent mobile code authentication and encryption program is arranged to the transmit data from the user's computing device to an application server by encrypting the data and transmitting the data to the authentication server for forwarding to the application server, and by decrypting data originating from the application server and transmitted via the authentication server,*
  *wherein the downloaded platform-independent mobile code authentication and encryption program includes mobile code authentication information,*
  *wherein the platform-independent mobile code authentication and encryption program authenticates itself by sharing the mobile code authentication information with the authentication server, and*
  *wherein the mobile code authentication information is an encryption key.*

*8. A system for establishing secured communications pathways across an open unsecured network using mobile code, comprising:*
  *an authentication server;*
  *at least one application server arranged to be connected to the authentication server by a secured pathway; and*
  *at least one platform-independent mobile code authentication and encryption program,*
  *wherein said authentication server is arranged to supply said platform-independent mobile code authentication and encryption program to a user's computing device upon authentication of the user,*
  *wherein said platform-independent mobile code authentication and encryption program is arranged to authenticate itself to the authentication server to establish a secure communications pathway without requiring pre-installation of authentication and encryption client software on the user's computing device,*
  *wherein said platform-independent mobile code authentication and encryption program is arranged to the transmit data from the user's computing device to an application server by encrypting the data and transmitting the data to the authentication server for forwarding to the application server, and by decrypting data originating from the application server and transmitted via the authentication server,*
  *wherein the downloaded platform-independent mobile code authentication and encryption program includes mobile code authentication information,*
  *wherein the platform-independent mobile code authentication and encryption program authenticates itself by sharing the mobile code authentication information with the authentication server , and*
  *wherein the mobile code authentication information is different from and does not include authentication information associated with the user.*

* * * * *